(12) United States Patent
Larsson et al.

(10) Patent No.: US 9,377,143 B2
(45) Date of Patent: Jun. 28, 2016

(54) HOSE CONNNECTION

(71) Applicant: Wayne Fueling Systems LLC, Addison, TX (US)

(72) Inventors: Bengt Ingemar Larsson, Malmo (SE); Marie Hakansson, Malmo (SE); Jonas Hansson, Malmo (SE)

(73) Assignee: Wayne Fueling Systems LLC, Austin, TX (US)

( * ) Notice: Subject to any disclaimer, the term of this patent is extended or adjusted under 35 U.S.C. 154(b) by 474 days.

(21) Appl. No.: 13/832,475

(22) Filed: Mar. 15, 2013

(65) Prior Publication Data
US 2013/0193680 A1    Aug. 1, 2013

Related U.S. Application Data

(63) Continuation of application No. 12/636,585, filed on Dec. 11, 2009, now Pat. No. 8,430,429.

(30) Foreign Application Priority Data

Dec. 12, 2008    (EP) ..................................... 08171510

(51) Int. Cl.
*F16L 35/00*    (2006.01)
*B67D 7/04*    (2010.01)
*B67D 7/78*    (2010.01)
(Continued)

(52) U.S. Cl.
CPC ................ *F16L 35/00* (2013.01); *B67D 7/0478* (2013.01); *B67D 7/78* (2013.01); *F16L 3/24* (2013.01); *F16L 37/1225* (2013.01)

(58) Field of Classification Search
CPC ......... F16L 35/00; F16L 13/1225; F16L 3/24; B67D 7/0478; B67D 7/78
USPC ......... 141/346, 279, 387, 388, 389, 383, 384; 222/74, 526, 538; 285/82; 292/1, 87, 292/303
See application file for complete search history.

(56) References Cited

U.S. PATENT DOCUMENTS 3,453,005 A * 7/1969 Foults .............................. 285/82
3,479,069 A * 11/1969 Sedam ................ F16L 37/1225
285/364

(Continued)

FOREIGN PATENT DOCUMENTS

DE    10032940    1/2001
DE    102006019257    10/2007
(Continued)

OTHER PUBLICATIONS

European Search Report for European Application No. 08171510, Apr. 16, 2009, 2 pages.

*Primary Examiner* — Mark A Laurenzi
*Assistant Examiner* — James Hakomaki
(74) *Attorney, Agent, or Firm* — Mintz Levin Cohn Ferris Glovsky and Popeo, P.C.

(57) ABSTRACT

A hose connection is provided for a fuel dispensing unit. The hose connection includes a pipe for transporting fuel from a fuel reservoir, a hose for transporting fuel to a motor vehicle, an intermediate member adapted to connect the hose with the pipe, and a locking device fixed to the fuel dispensing unit adapted to interlock the pipe and the intermediate member. The hose connection is secured in relation to the fuel dispensing unit. A fuel dispensing unit including such hose connection is also provided.

24 Claims, 5 Drawing Sheets

(51) Int. Cl.
*F16L 3/24* (2006.01)
*F16L 37/12* (2006.01)

(56) References Cited

U.S. PATENT DOCUMENTS

| | | | |
|---|---|---|---|
| 3,538,940 A * | 11/1970 | Graham | 137/271 |
| 3,921,684 A | 11/1975 | Allen | |
| 3,929,357 A * | 12/1975 | DeVincent et al. | 285/319 |
| 3,973,791 A * | 8/1976 | Porta et al. | 285/305 |
| 4,423,892 A * | 1/1984 | Bartholomew | 285/319 |
| 4,913,468 A * | 4/1990 | Rattmann | F16L 37/1225 285/114 |
| 5,129,432 A * | 7/1992 | Dugger | 141/1 |
| 5,203,384 A | 4/1993 | Hansen | |
| 5,405,175 A * | 4/1995 | Bonnah, II | F02M 55/004 24/DIG. 53 |
| 5,593,187 A * | 1/1997 | Okuda | F16L 37/088 385/305 |
| 5,704,655 A | 1/1998 | Lemburg | |
| 5,718,463 A | 2/1998 | Hollnagel | |
| 6,217,084 B1 | 4/2001 | Larsson et al. | |
| 6,386,596 B1 * | 5/2002 | Olson | F16L 37/0925 285/305 |
| 6,983,958 B2 * | 1/2006 | Rautureau | 285/305 |
| 7,338,086 B2 * | 3/2008 | Poder et al. | 285/81 |
| 7,789,436 B2 * | 9/2010 | Bellanti | F16L 37/1225 285/325 |
| 2001/0019209 A1 * | 9/2001 | Larsson et al. | 285/305 |
| 2002/0071718 A1 * | 6/2002 | Marty | F16L 37/1225 403/293 |
| 2004/0073525 A1 | 4/2004 | Stanley | |
| 2004/0183301 A1 * | 9/2004 | Yoshida | 285/305 |
| 2008/0315576 A1 | 12/2008 | Moretti et al. | |
| 2010/0129249 A1 | 5/2010 | Bianchi et al. | |
| 2010/0147901 A1 | 6/2010 | Larsson et al. | |

FOREIGN PATENT DOCUMENTS

| | | |
|---|---|---|
| DE | 102007025406 | 1/2008 |
| EP | 1231425 | 8/2002 |
| EP | 1801484 | 6/2007 |
| EP | 2196718 A1 | 6/2010 |

* cited by examiner

HOSE CONNNECTION

CLAIM OF PRIORITY

This application is a continuation of U.S. patent application Ser. No. 12/636,585, filed on Dec. 11, 2009, and entitled "Hose Connection," which claims the benefit of priority under 35 U.S.C. §119 to a foreign priority application Serial No. 08171510.4, filed in the European Patent Office on Dec. 12, 2008. The entire contents of these applications is hereby incorporated by reference in its entirety.

TECHNICAL FIELD

The present invention relates to a hose connection for a fuel dispensing unit. The invention also relates to a fuel dispensing unit comprising such a hose connection.

TECHNICAL BACKGROUND

A problem with the hose connections today is that they generally comprise many different components which make the assembly of each hose connection stressing and time consuming for the mechanic performing the operation. Also, the potential risk of leakage between components naturally increases in accordance with the number of components included in the hose connection.

SUMMARY OF THE INVENTION

It is an object of the present invention to provide an improvement of the prior art. More particularly, it is an object of the present invention to provide a hose connection comprising a minimal number of components in order to reduce the assembly time and thus the assembly costs for the hose connection. Further, it is an object of the present invention to provide a more reliable hose connection in regard to leakage between the components included in the hose connection.

These and other objects as well as advantages that will be apparent from the following description of the present invention are achieved by the hose connection and the fuel dispensing unit comprising such a hose connection described below.

Thus, the present invention provides a hose connection for a fuel dispensing unit, comprising a pipe for transporting fuel from a fuel reservoir, a hose for transporting fuel to a motor vehicle, an intermediate member adapted to connect said hose with said pipe, and a locking device fixed to said fuel dispensing unit adapted to interlock said pipe and said intermediate member, whereby said hose connection is secured in relation to said fuel dispensing unit. This is advantageous in that the number of components included in the hose connection is small and that, in preferred embodiments, they are easily connected to each other, without using bolts, screws, welding, etc. In this way, the assembly time and thus the assembly costs for each hose connection is minimized. Also, the load of the mechanic performing the assembly is reduced since no screwing or other anatomically stressing movements need to be performed. Further, the risk of leakage between the components included in the hose connection is reduced.

An end portion of the pipe may be provided with a seal member, said end portion of said pipe being adapted to enter a receiving portion in said intermediate member, in order to connect said pipe with said intermediate member. This is advantageous in that a reliable sealing between the pipe drawing fuel from the underground reservoir and the intermediate member is achieved.

The end portion of said pipe may be provided with two annular beads which accommodate an O-ring between them, said end portion of said pipe being adapted to enter a receiving portion in said intermediate member, in order to connect said pipe with said intermediate member. This is advantageous in that a reliable sealing between the pipe drawing fuel from the underground reservoir and the intermediate member is achieved.

The intermediate member may comprise at least one port, to which a vapor recovery pipe may be connected. The vapor recovery is then achieved, for instance, by arranging a vapor suction nozzle next to the fuel dispensing nozzle of a pistol grip for filling the tank with fuel. Further, the recovered fuel vapor may be transported through a coaxial hose, via the vapor recovery pipe in the hose connection to the underground reservoir. This measure is taken for both safety and environmental reasons.

An end portion of said vapor recovery pipe may be provided with a seal member, said end portion of said vapor recovery pipe being adapted to enter a receiving portion in said port, in order to connect said vapor recovery pipe with said intermediate member. This is advantageous in that a reliable sealing between the vapor recovery pipe the intermediate member is achieved.

The end portion of said vapor recovery pipe may be provided with two annular beads which accommodate an O-ring between them, said end portion of said vapor recovery pipe being adapted to enter a receiving portion in said port, in order to connect said vapor recovery pipe with said intermediate member. This is advantageous in that a reliable sealing between the vapor recovery pipe the intermediate member is achieved.

The hose connection may further comprise a fastening device securing said vapor recovery pipe in relation to said intermediate member, which is advantageous in that the risk of the vapor recovery pipe dislodging from the intermediate member is eliminated.

The locking device may comprise a connector protruding in a transverse direction in relation to said hose which is adapted to engage with at least one portion of said intermediate member. In this way, the intermediate member is secured to the to the fuel dispensing unit via said locking device.

The at least one portion of said intermediate member may comprise a reduced cross section, which enables the locking device to reliably engage with the intermediate member.

The connector protruding in a transverse direction in relation to said hose may engage with at least one of said two annular beads provided on said pipe. Accordingly, the pipe and the intermediate member will be reliably secured to each other in a longitudinal direction in relation to the hose as long as they are provided in the locking device.

The locking device may comprise a resilient member adapted to at least partly enclose said intermediate member. This secures the intermediate member and the pipe to the fuel dispensing unit, via the locking device, in a transverse direction in relation to the hose.

The resilient member may be locked by use of at least one groove provided in said connector protruding in a transverse direction in relation to said hose. This is advantageous in that the risk of the resilient member unintentionally releasing the intermediate member and the pipe from the locking device and thus also from the fuel dispensing unit will be eliminated.

The resilient member may be adapted to move from a first groove provided in said connector protruding in a transverse direction in relation to said hose to a second groove provided in said connector protruding in a transverse direction in relation to said hose, thereby locking the resilient member. This is advantageous in that the risk of the resilient member unintentionally releasing the intermediate member and the pipe from the locking device and thus also from the fuel dispensing unit will be eliminated.

The hose may be connected to said intermediate member in an undetachable manner, which is advantageous in that one more step during assembly of the hose connection is eliminated. Also, the risk of leakage between the hose and the intermediate member is minimized.

According to a second aspect of the present invention, the invention relates to a fuel dispensing unit comprising a hose connection according to the above described features.

Generally, all terms used below are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION

Figure 1:
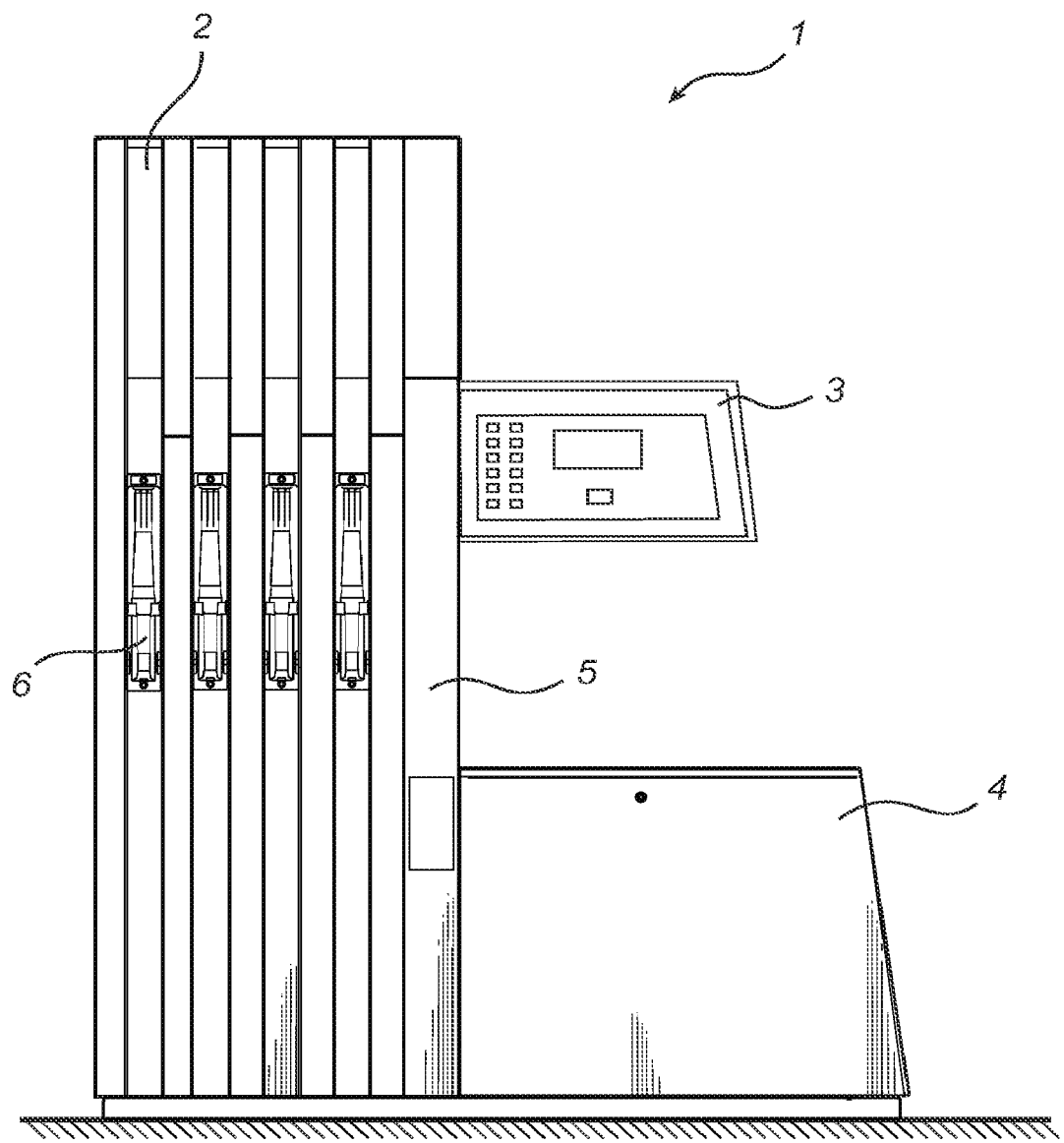
FIG. 1 is a schematic view of a fuel dispensing unit.

FIG. 1 illustrates a fuel dispensing unit 1, having four hose storage spaces 2 on each opposing side of the fuel dispensing unit 1, an electrical cabinet 3 containing all the electronics for the fuel dispensing unit 1, a hydraulic cabinet 4 containing fuel dispensing means (not shown), e.g. fuel metering means, valves, vapor recovery system etc, and a column 5 extending vertically between and separating the electrical cabinet 3 and the hydraulic cabinet 4 from the hose storage spaces 2. The fuel dispensing unit 1 is connected to an underground reservoir (not shown) containing fuel. When filling up the tank of a motor vehicle, the fuel is pumped from the underground reservoir by means of a pump (not shown) which is located in the hydraulic cabinet 4, and from there to the column 5 and out to a nozzle 6 via a hose 7. When filling-up does not take place, the hose 7 is accommodated in a hose storage place 2 and the nozzle 6 is inserted in a nozzle boot (not shown).

Figure 2:
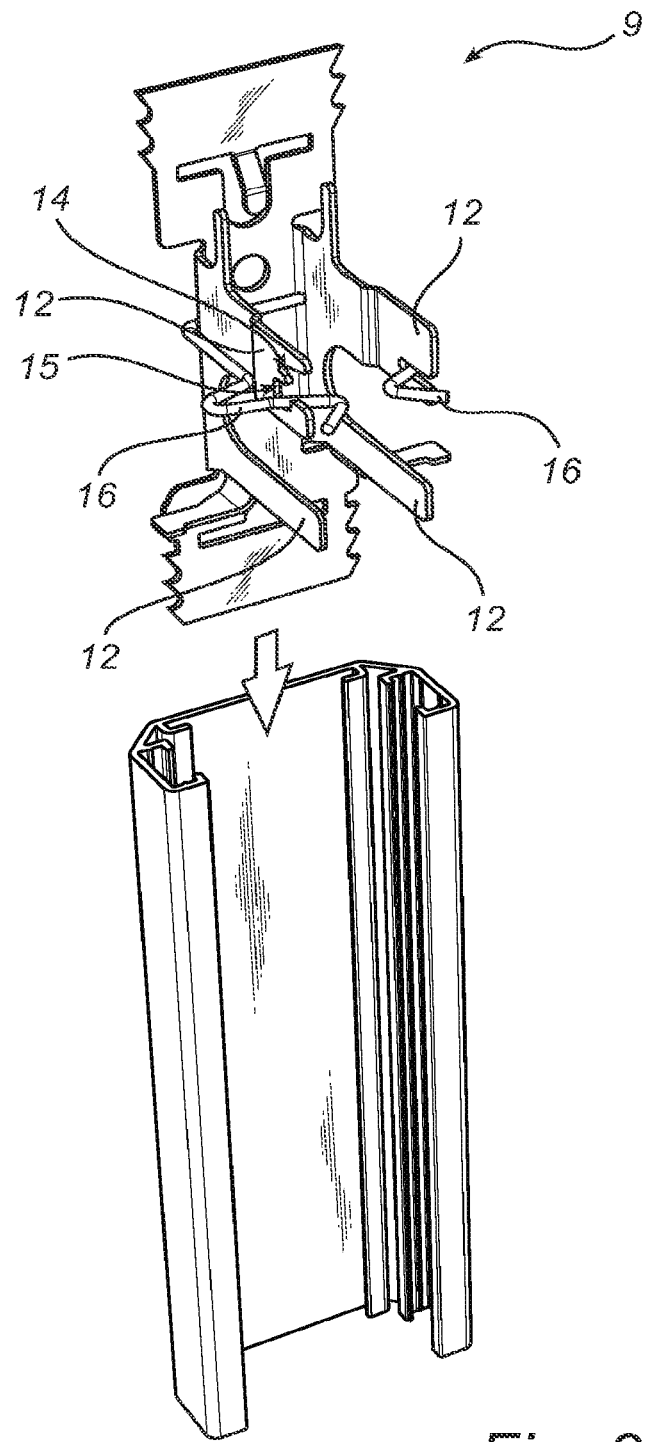
FIG. 2 is a perspective view of a locking device included in a hose connection according to a first embodiment of the invention.
Figure 3:
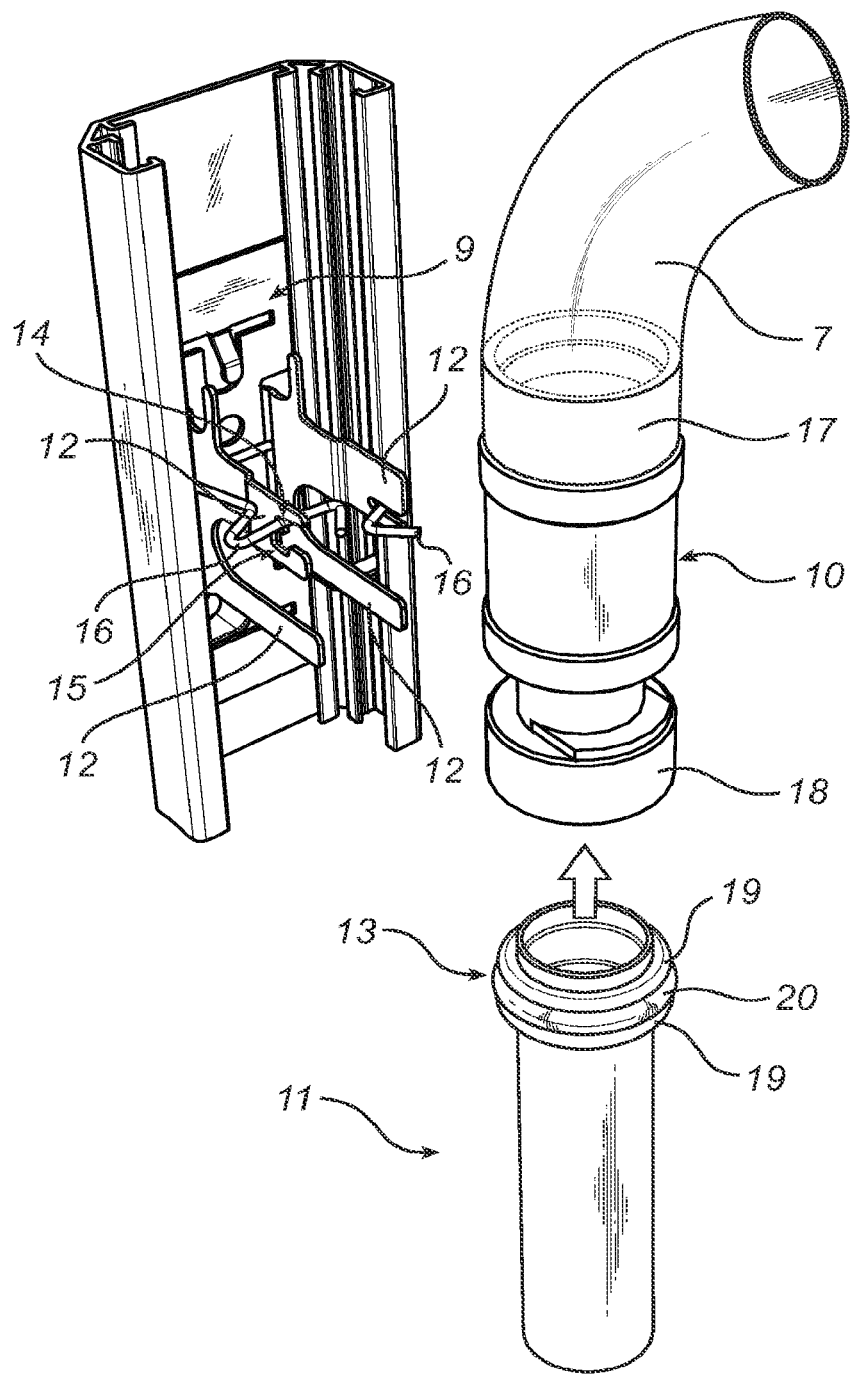
FIG. 3 is a perspective view of the hose connection according to the first embodiment of the invention comprising the locking device in FIG. 2, a hose, an intermediate member and a pipe.

FIG. 2 and FIG. 3 illustrate the components included in a hose connection 8 according to a first embodiment of the invention. The hose connection 8 comprises a locking device 9, a hose 7, an intermediate member 10 and a pipe 11. The locking device 9 is adapted to be fixed to the fuel dispensing unit 1 for example by means of screws, bolts, welds, etc. Further, the locking device 9 is adapted to interlock the intermediate member 10 and the pipe 11 as well as to secure the hose connection 8 to the fuel dispensing unit 1. The intermediate member 10 is adapted to connect the pipe 11 for transporting fuel from a fuel reservoir and the hose 7 for transporting fuel to a motor vehicle. The locking device 9 comprises at least one connector 12 protruding in a transverse direction in relation to the hose 7, which connector 12 is adapted to engage with the intermediate member 10 and an end portion 13 of the pipe 11 in order to interlock the intermediate member 10 and the pipe 11. The connector 12 of the locking device 9 comprises a first groove 14 and a second groove 15. Naturally, the number of connector(s) 12 protruding from the locking device 9 as well as the number of grooves 14, 15 provided in said connector(s) 12 can be varied. The locking device 9 further comprises a resilient member 16 adapted to at least partly enclose the intermediate member 10. The intermediate member 10 has an upper portion 17 and a lower portion 18. The hose 7 is fixedly mounted to the upper portion 17 of the intermediate member 10. The end portion 13 of the pipe 11 is adapted to enter a receiving portion in the lower portion 18 of the intermediate member 10, in order to connect the pipe 11 with the intermediate member 10. In the embodiment shown in FIG. 3, the end portion 13 of the pipe 11 is provided with two annular beads 19 which accommodate an O-ring 20 between them. The number of beads 19 can be varied. Off course, the pipe 11 can be connected to the intermediate member 10 in other ways, such as screwing, bolting, welding, etc.

Figure 4:
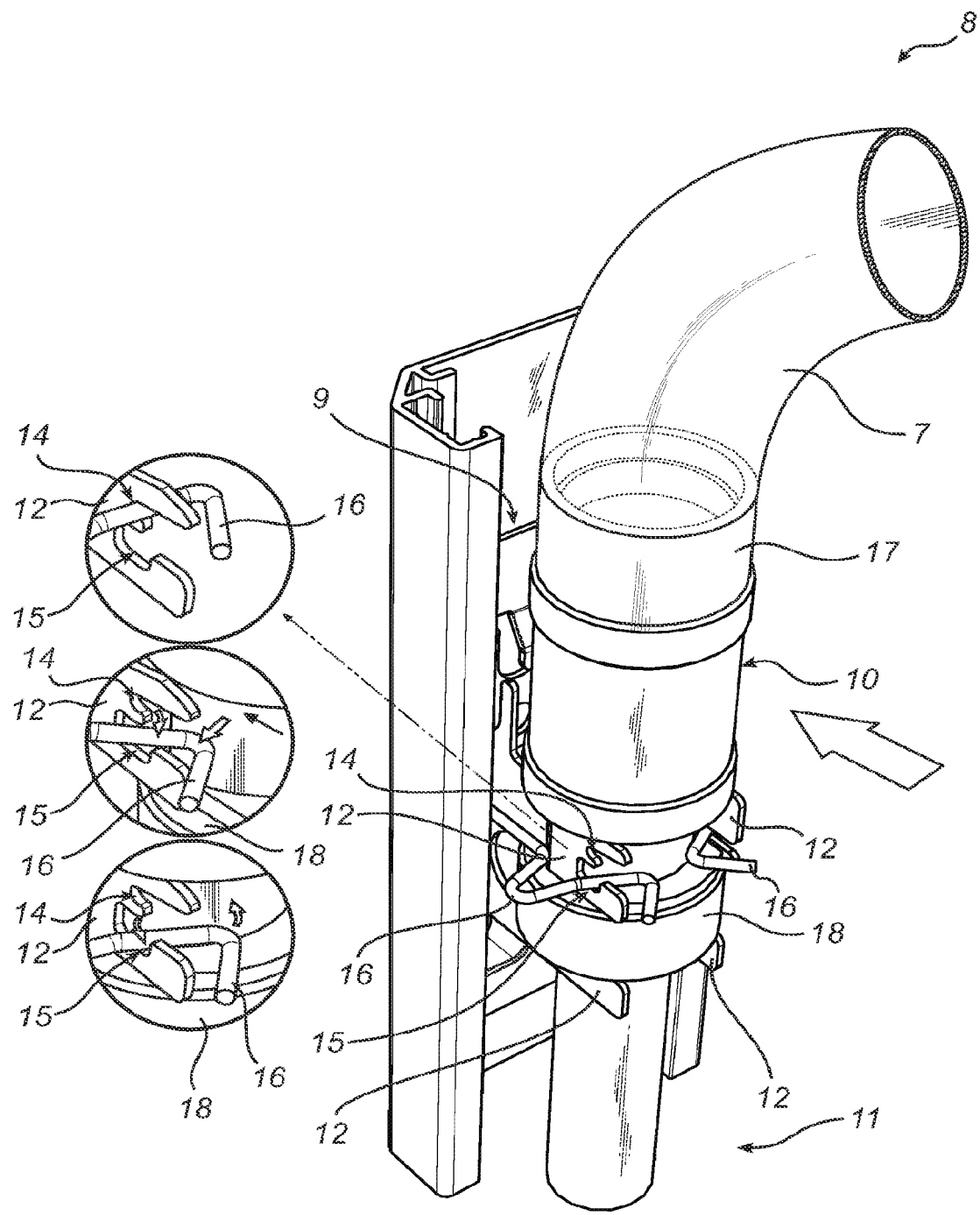
FIG. 4 is a perspective view of the hose connection in FIG. 3, wherein the pipe is connected to the intermediate member and the intermediate member is provided in the locking device.

In FIG. 4 the hose connection 8 according to a first embodiment of the invention is illustrated, wherein the hose 7 is connected to the pipe 11 via the intermediate member 10 and the intermediate member 10 is provided in the locking device 9. The end portion 13 of the pipe 11 having two annular beads 19 which accommodate an O-ring 20 between them is provided in the receiving portion of the lower portion 18 of the intermediate member 10, thereby creating a sealed connection between pipe 11 and the intermediate member 10. The connector 12 of the locking device 9 protruding in a transverse direction in relation to the hose 7 are engaged with a portion of the intermediate member 10, which portion comprises a reduced cross section. Further, in the embodiment shown in FIG. 4, the connector 12 of the locking device 9 protruding in a transverse direction in relation to the hose 7 are engaged with one of the two annular beads 19 of the end portion 13 of the pipe 11, thereby interlocking the intermediate member 10 and the pipe 11. The resilient member 16 is provided in the second groove 15 of the connector 12 of the locking device 9, thereby locking the resilient member 16.

Figure 5:
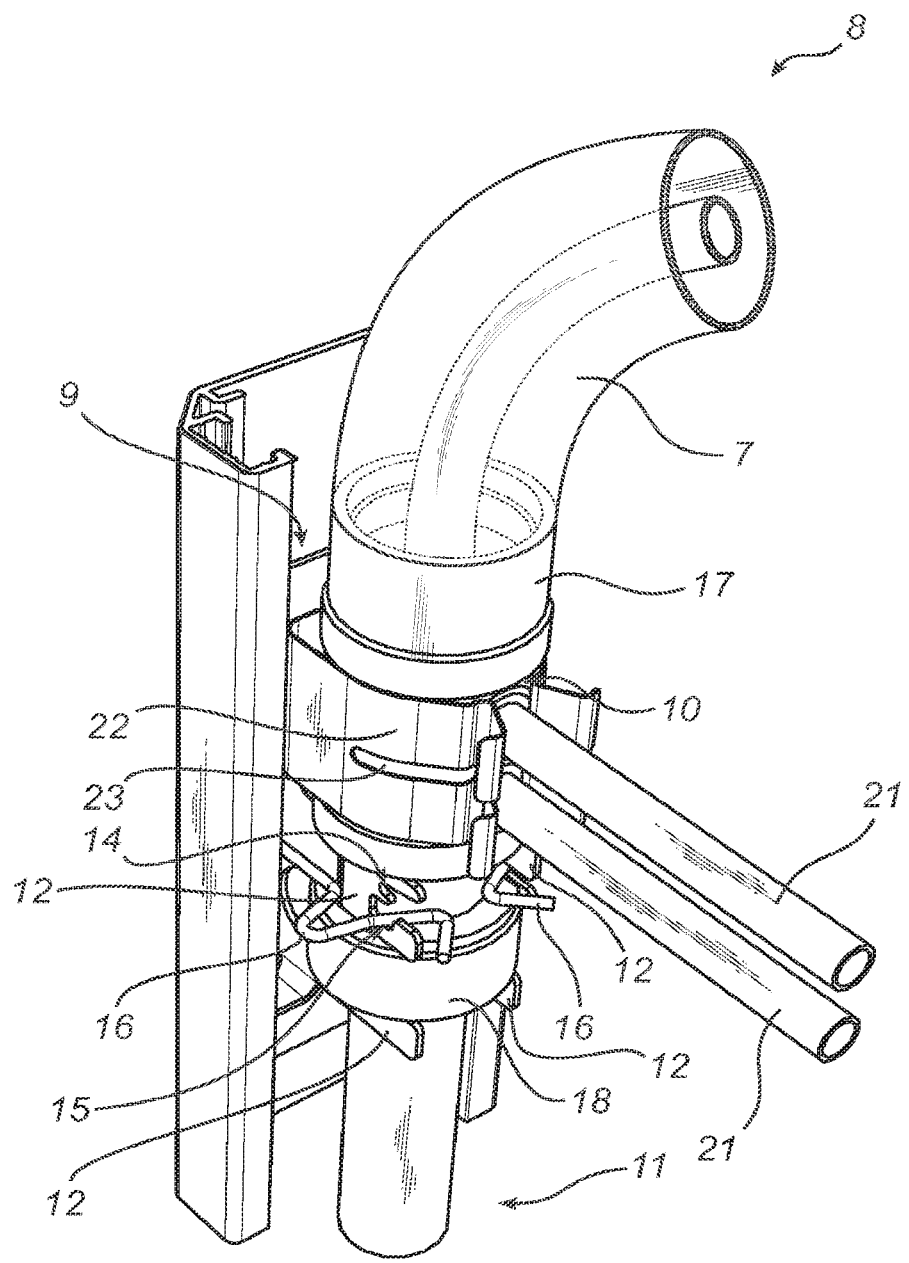
FIG. 5 is a perspective view of a hose connection according to a second embodiment of the invention.

FIG. 5 illustrates a hose connection 8 according to a second embodiment of the present invention. The intermediate member 10 comprises two ports. A vapor recovery pipe 21 is connected to each one of the two ports. The end portions of the vapor recovery pipes 21 are provided with two annular beads which accommodate an O-ring between them. The end portions of the vapor recovery pipes 21 are provided in a receiving portion of the ports of the intermediate member 10. Naturally, the vapor recovery pipes 21 can be connected to the ports of the intermediate member 10 in other ways, such as by means of screwing, bolting, welding, etc. A fastening device 22 is provided on the intermediate member 10 securing the vapor recovery pipes 21 in relation to the intermediate member 10. The fastening device 22 comprises a slot 23 on each side so that the vapor recovery pipes 21 can be attached to and detached from the intermediate member 10, respectively. The hose 7 is coaxial in order to separate fuel and vapor.

When the hose connection 8 is to be secured in relation to the fuel dispensing unit 1, the locking device 9 is fixed to the fuel dispensing unit 1 in a suitable manner. The hose 7 is fixedly connected to the upper portion 17 of the intermediate member 10 and the end portion 13 of the pipe 11 is connected to the receiving portion in the lower portion 18 of the intermediate member 10 by means of the two annular beads 19 and the O-ring 20 accommodated between said beads 19. Thus, the hose 7 and the pipe 11 are in communication with each other. Finally, the intermediate member 10 is provided in the locking device 9, so that the connector 12 protruding in a transverse direction in relation to the hose 7 engage with the intermediate member 10 and one of the two annular beads 19 of the end portion 13 of the pipe 11, thereby interlocking the pipe 11 and the intermediate member 10. When the intermediate member 10 is provided in the locking device the resilient member 16 moves from the original position in the first groove 14 to a locking position in the second groove 15, thereby securing the intermediate member 10 and thus the hose connection 8 to the fuel dispensing unit. Accordingly, the intermediate member 10 and the pipe 11 are secured in relation to the locking device 9 in a longitudinal direction in relation to the hose 7 by means of the connector 12 and in a transverse direction in relation to the hose 7 by means of the resilient member 16.

The hose 7 can be connected to the intermediate member 10 in many different ways. In one embodiment the hose 7 is connected to the intermediate member 10 in an undetachable manner. However, it can also be connected to the intermediate member 10 by means of for example screwing, bolting, welding, etc. The transverse and longitudinal direction in relation to the hose 7 relates to the hose 7 when running along a side wall of the fuel dispensing unit 1.

According to a second aspect of the invention a fuel dispensing unit is provided comprising a hose connection according to the above described features.

The invention has mainly been described above with reference to a few embodiments. However, as is readily appreciated by a person skilled in the art, other embodiments than the ones disclosed above are equally possible within the scope of the invention.

The invention claimed is:

1. A locking device for a fuel dispensing unit comprising a pipe for transporting fuel from a fuel reservoir, the locking device comprising:
   an intermediate member having a longitudinal axis, the locking device being configured to secure the intermediate member to the fuel dispensing unit;
   a connector configured to engage at least one portion of the intermediate member to connect the intermediate member and the pipe, the connector comprising a first groove and a second groove, the second groove being at a different axial position than the first groove along the longitudinal axis; and
   a resilient member configured to at least partly enclose the intermediate member,
   wherein the resilient member is configured to move from the first groove to the second groove to move the locking device from an unlocked position to a locked position; and
   wherein the second groove is configured to restrain movement of the resilient member relative to the intermediate member when the resilient member is disposed in the second groove.

2. The locking device of claim 1, wherein the intermediate member has a receiving portion that engages a seal member disposed on an end portion of the pipe.

3. The locking device of claim 2, wherein the end portion comprises a first annular bead and a second annular bead, and wherein the seal member is disposed between the first annular bead and the second annular bead.

4. The locking device of claim 1, further comprising a vapor recovery pipe in fluid connection with the intermediate member.

5. The locking device of claim 4, further comprising a fastening device disposed on the intermediate member.

6. The locking device of claim 1, wherein the first groove is disposed vertically above the second groove along the longitudinal axis.

7. A fuel dispenser, comprising:
   a pipe configured to transport fuel from a fuel reservoir; and
   the locking device of claim 1 configured to lock the pipe and the intermediate member in the locked position.

8. The fuel dispenser of claim 1, wherein the at least one portion of the intermediate member has a reduced cross-section.

9. A locking device for a fuel dispensing unit comprising a pipe for transporting fuel from a fuel reservoir, the locking device comprising:
   an intermediate member having a longitudinal axis, the locking device being configured to secure the intermediate member to the fuel dispensing unit;
   a connector configured to engage at least one portion of the intermediate member to connect the intermediate member and the pipe, the connector comprising a first groove and a second groove, the second groove being at a different axial position than the first groove along the longitudinal axis; and
   a resilient member configured to at least partly enclose the intermediate member,
   wherein the resilient member is configured to move from the first groove to the second groove to move the locking device from an unlocked position to a locked position; and
   wherein the intermediate member has a reduced diameter portion, and the at least one portion of the intermediate member engaged by the connector includes the reduced diameter portion such that a portion of the connector is seated in the reduced diameter portion.

10. The locking device of claim 9, wherein the connector protrudes in a direction transverse to the intermediate member in the locked position.

11. The locking device of claim 9, wherein the first groove is vertically above the second groove.

12. The locking device of claim 9, wherein the intermediate ember has a receiving portion that engages a seal member disposed on an end portion of the pipe.

13. The locking device of claim 12, wherein the end portion comprises a first annular bead and a second annular bead, and wherein the seal member is disposed between the first annular bead and the second annular bead.

14. The locking device of claim 9, further comprising a vapor recovery pipe in fluid connection with the intermediate member.

15. The locking device of claim 14, further comprising a fastening device disposed on the intermediate member.

16. A fuel dispenser, comprising:
   a pipe configured to transport fuel from a fuel reservoir; and the locking device of claim 9 configured to lock the pipe and the intermediate member in the locked position.

17. A locking device for a fuel dispensing unit comprising a pipe for transporting fuel from a fuel reservoir, the locking device comprising:
   an intermediate member having a longitudinal axis, the locking device being configured to secure the intermediate member to the fuel dispensing unit;
   a connector configured to engage at least one portion of the intermediate member to connect the intermediate member and the pipe, the connector comprising a first groove and a second groove, the second groove being at a different axial position than the first groove along the longitudinal axis; and
   a resilient member configured to at least partly enclose the intermediate member,
   wherein the resilient member is configured to move from the first grove to the second groove to move the locking device from an unlocked position to a locked position; and
   wherein the connector includes a protrusion disposed between the first and second grooves, the resilient member being configured to slide along the protrusion when moving from the first groove to the second groove.

18. The locking device of claim 17, further comprising a vapor recovery pipe in fluid connection with the intermediate member.

19. The locking device of claim 18, further comprising a fastening device disposed on the intermediate member.

20. The locking device of claim 17, wherein the first position is vertically below the second position.

21. The locking device of claim 17, wherein the intermediate member has a receiving portion that engages a seal member disposed on an end portion of the pipe.

22. The locking device of claim 21 wherein the end portion comprises a first annular bead and a second annular bead, and wherein the seal member is disposed between the first annular bead and the second annular bead.

23. The locking device of claim 17, wherein the at least one portion of the intermediate member has a reduced cross-section.

24. A fuel dispenser, comprising:
   a pipe configured to transport fuel from a fuel reservoir; and
   the locking device of claim 17 configured to lock the pipe and the intermediate member.

* * * * *